G. W. MAXWELL & J. J. BREWER.
HONEY BOX SECTION.
APPLICATION FILED JAN. 27, 1909.
929,616.
Patented July 27, 1909.
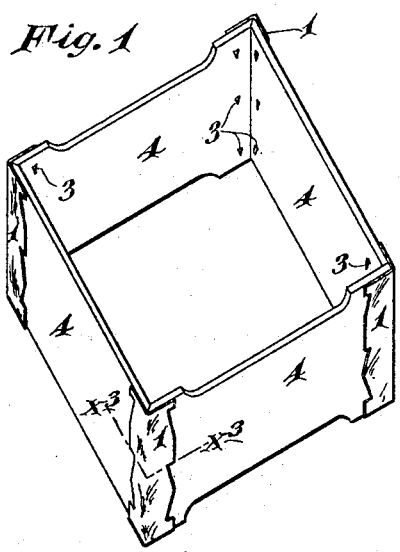
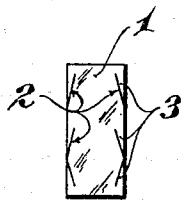
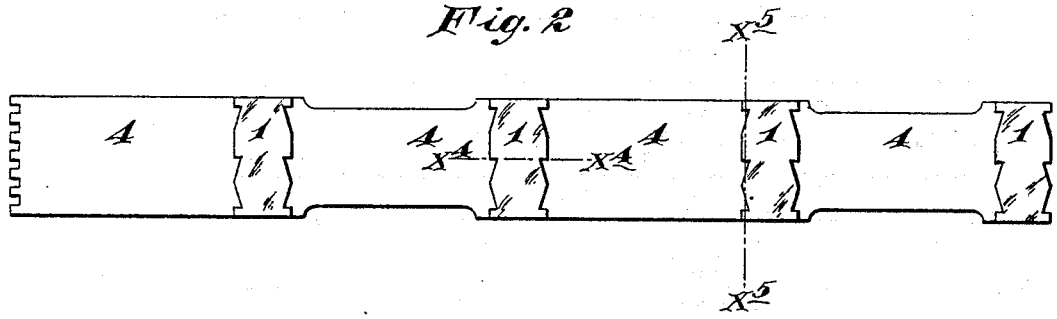
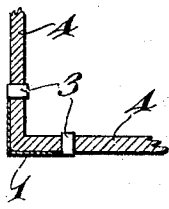
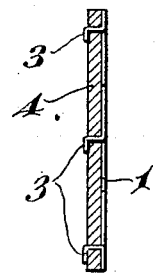
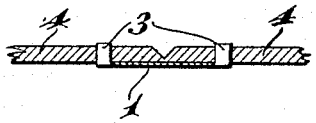
Witnesses:
L. L. Simpson,
R. P. Hicks.
Inventors:
G. W. Maxwell & J. J. Brewer,
By his Attorneys,
Williamson Merchant

UNITED STATES PATENT OFFICE.

GEORGE W. MAXWELL AND JEREMIAH J. BREWER, OF ST. PAUL, MINNESOTA; SAID BREWER ASSIGNOR TO SAID MAXWELL.

HONEY-BOX SECTION.

No. 929,616.          Specification of Letters Patent.          Patented July 27, 1909.

Application filed January 27, 1909. Serial No. 474,636.

*To all whom it may concern:*

Be it known that we, GEORGE W. MAXWELL and JEREMIAH J. BREWER, citizens of the United States, residing at St. Paul, in the county of Ramsey and State of Minnesota, have invented certain new and useful Improvements in Honey-Box Sections; and we do hereby declare the following to be a full, clear, and exact description of the invention, such as will enable others skilled in the art to which it appertains to make and use the same.

Our invention relates to honey boxes or so called sections, and has for its object to provide an extremely simple, cheap and highly efficient metallic reinforcing clip therefor.

To the above ends, the invention consists of the novel devices and combinations of devices hereinafter described and defined in the claims.

The invention is illustrated in the accompanying drawings, wherein like characters indicate like parts throughout the several views.

Referring to the drawings: Figure 1 is a perspective view showing the completed honey box; Fig. 2 is a plan view showing the so called box section laid out flat; Fig. 3 is a horizontal section taken on the line $x^3$ $x^3$ of Fig. 1; Fig. 4 is a horizontal section taken on the line $x^4$ $x^4$ of Fig. 2; Fig. 5 is a vertical section taken on the line $x^5$ $x^5$ of Fig. 2; and Fig. 6 is a plan view showing one of the corner reinforcing clips laid out flat.

The numeral 4 indicates the wooden body portion of the honey box or section, which in itself, is of standard construction. These box sections, as is well known, are made from thin wooden strips having kerfs at three different places, adapting the box to be folded into rectangular form, and usually joined at the fourth corner by dovetailed joints, which latter however, are not absolutely necessary, when the improved reinforcing clips are used. In fact, the present box may be made of four separate pieces of suitable material.

The customary wooden honey box or section is extremely weak at its corners, because the kerfs must of necessity, be nearly cut through the wood; and if the sections are at all dry when bent, they are sure to be broken apart at the kerfs, thus destroying the box section under the ordinary use. Furthermore, when these box sections are put together, they are seldom square, and when they are filled with honey and are forced into a packing or shipping case and are caused to square up by pressure of other boxes, they are frequently strained and broken loose from the honey comb, and sometimes the entire cake of honey is cracked thus producing a leakage of honey which will very greatly damage and consequently decrease the value of the entire case of honey. It is also a well known fact, that bees stick the boxes together when within the hive by means of a very hard gummy material known as propolis. This propolis must be scraped off from the boxes or sections before shipping, and in doing this, with the old form of wooden box, many are broken at their corners so that they are loosened from the honey comb, thus damaging the honey. All of these objectional features are eliminated and a very strong box or section is provided by the use of our improved metallic corner clips. These improved corner clips are preferably constructed from small thin sheet metal sections, such as tin, which primarily has the form shown in Fig. 6, by reference to which it will be noted, that the flat rectangular body portions 1, at their opposite edges, are obliquely slit or cut at 2 to form sharp clenching barbs 3. These corner clips are preferably applied to the wooden body section 4 at the proper places to reinforce the corners of the box, while the said wooden section is laid out flat as shown in Fig. 2, one edge of one of the said clips being applied at one edge only to one end of the said wooden sections 4. When the clips are to be applied, their barbs 3 are bent in the same direction at a right angle to the face of the clip, and these barbs are forced through the wooden section and their ends are clenched or bent over at that side of the box section which is to form the interior of the box. This gives a nearly completed box in flat form which adapts the sections to be closely packed for shipment. To complete the box at the place where it is to be used, it is only necessary to bend the section into rectangular form, and to connect the notched ends of the section by means of the barbs at the projecting edge of the end clip, the said barbs, of course, being forced through the other end of the wooden section and clenched in the manner above indicated.

A box constructed as above described, will be extremely strong at its corners, and in fact, will be stronger at its corners than at any other place. Furthermore, the barbs keep the edges of the metal clips closely drawn against the wooden portion of the box or section, so that the clips of one box will not catch upon the clips of another box, and a multiplicity of boxes may be closely packed together. In folding the section at its kerfs, the beveled portions of the kerf are very tightly drawn together, and when these kerfs are cut with 45 degree bevels, this drawing action will square up the completed box. Obviously, these clips may be applied to the box sections at extremely low cost, and the box sections may be folded into box form as easily as an ordinary wooden section. The saving of the wooden box sections by the use of these corner clips will many times more than pay for the cost of the clips, aside from the large saving of honey above noted, which results from the use thereof.

What we claim is:

1. A honey box having applied to the exterior of its four corners, thin metal reinforcing clips having laterally bent barbs cut therefrom and pressed through the sides of said box and clenched at the inside thereof, those portions of said barbs which are forced through the sides of said box extending edgewise longitudinally of said sides, substantially as described.

2. A honey box section in flat form having at the abutting ends or kerfs of its side forming portions, and at one end of said section, metal reinforcing clips applied while said section is laid out flat, the said barbs being formed by slits cut obliquely in the extreme edge portions of said metal clips, substantially as described.

3. A honey box section in flat form, having at its kerfs or abutting ends of its side forming portions, and at one end of the said section, metal reinforcing clips applied while the said section is laid out flat, the end member of said clips projecting at one edge from that end of the section to which it is applied.

In testimony whereof we affix our signatures in presence of two witnesses.

GEORGE W. MAXWELL.
JEREMIAH J. BREWER.

Witnesses:
HARRY E. GEORGE,
J. E. McCAFFREY.